(12) United States Patent
Wool

(10) Patent No.: US 8,677,496 B2
(45) Date of Patent: Mar. 18, 2014

(54) METHOD AND APPARATUS FOR AUTOMATIC RISK ASSESSMENT OF A FIREWALL CONFIGURATION

(75) Inventor: Avishai Wool, Petach-Tikva (IL)

(73) Assignee: Algosec Systems Ltd., Petah Tikva (IL)

( * ) Notice: Subject to any disclaimer, the term of this patent is extended or adjusted under 35 U.S.C. 154(b) by 694 days.

(21) Appl. No.: 12/840,851

(22) Filed: Jul. 21, 2010

(65) Prior Publication Data

US 2010/0293617 A1 Nov. 18, 2010

Related U.S. Application Data

(63) Continuation-in-part of application No. 11/175,781, filed on Jul. 7, 2005, now abandoned.

(60) Provisional application No. 60/587,938, filed on Jul. 15, 2004.

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .......................................... 726/25; 713/193

(58) Field of Classification Search
USPC .......................................................... 726/25
See application file for complete search history.

(56) References Cited

U.S. PATENT DOCUMENTS

| | | | |
|---|---|---|---|
| 6,301,668 B1 | 10/2001 | Gleichauf et al. | |
| 6,484,261 B1 * | 11/2002 | Wiegel | 726/11 |
| 6,493,663 B1 | 12/2002 | Ueda | |
| 6,546,381 B1 | 4/2003 | Subramanian et al. | |
| 6,842,737 B1 | 1/2005 | Stiles et al. | |
| 6,895,383 B2 * | 5/2005 | Heinrich | 705/7.28 |
| 6,952,689 B2 * | 10/2005 | Brandon et al. | 706/45 |
| 6,952,779 B1 | 10/2005 | Cohen et al. | |
| 7,003,562 B2 * | 2/2006 | Mayer | 709/223 |
| 7,016,980 B1 | 3/2006 | Mayer et al. | |
| 7,146,639 B2 | 12/2006 | Bartal et al. | |
| 7,194,769 B2 | 3/2007 | Lippmann et al. | |
| 7,290,048 B1 | 10/2007 | Barnett et al. | |
| 7,421,734 B2 * | 9/2008 | Ormazabal et al. | 726/11 |
| 7,428,478 B2 | 9/2008 | Aragones | |
| 8,170,902 B2 * | 5/2012 | Kennis et al. | 705/7.28 |
| 2002/0104017 A1 * | 8/2002 | Stefan | 713/201 |
| 2002/0162017 A1 | 10/2002 | Sorkin et al. | |

(Continued)

OTHER PUBLICATIONS

Frederic Cuppens; Detection and Removal of Firewall Misconfiguration; Year: 2005; Crimplatinum; pp. 1-8.*

(Continued)

*Primary Examiner* — Mohammad W Reza
*Assistant Examiner* — Monjour Rahim
(74) *Attorney, Agent, or Firm* — Fleit Gibbons Gutman Bongini & Bianco PL; Martin Fleit; Paul D. Bianco

(57) ABSTRACT

A method and apparatus for Automatic Risk Assessment of a Firewall Configuration facilitates the automatic generation of a risk assessment of a given firewall configuration. The method scans the firewall analyzer report, before the human user does, and flag the Configuration errors. Each found misconfiguration is called a risk item. The report is analyzed according a Knowledge Base of known risk items. The method further filters duplicate risk item which are trigger by different rules.

13 Claims, 6 Drawing Sheets

(56) References Cited

U.S. PATENT DOCUMENTS

| | | |
|---|---|---|
| 2002/0169738 A1 | 11/2002 | Giel et al. |
| 2002/0169858 A1 | 11/2002 | Bellinger et al. |
| 2003/0028803 A1 | 2/2003 | Bunker et al. |
| 2003/0093696 A1 | 5/2003 | Sugimoto |
| 2004/0006546 A1* | 1/2004 | Wedlake et al. ............ 706/46 |
| 2004/0193918 A1 | 9/2004 | Green et al. |
| 2004/0221176 A1 | 11/2004 | Cole |
| 2005/0102534 A1 | 5/2005 | Wong |
| 2005/0160480 A1 | 7/2005 | Birt et al. |
| 2005/0209897 A1 | 9/2005 | Luhr |
| 2006/0015934 A1 | 1/2006 | Wool |
| 2006/0041936 A1 | 2/2006 | Anderson et al. |
| 2006/0075503 A1 | 4/2006 | Bunker et al. |
| 2006/0129587 A1 | 6/2006 | Renfro et al. |
| 2009/0248753 A1* | 10/2009 | Tsai et al. .................. 707/202 |
| 2009/0288158 A1* | 11/2009 | Izatt et al. .................. 726/13 |

OTHER PUBLICATIONS

"AlgoSec Firewall Analyzer Product Datasheet", 2 pages, unkown date.

"AlgoSec—Automated Firewall Rule Usage Statistics", 4 pages, printed: Aug. 28, 2009.

"AlgoSec—Products—Firewall Analyzer—Key Features", 2 pages, printed: Aug. 28, 2009.

"AlgoSec—Automated Firewall Rule Usage Statistics", 5 pages, printed: Aug. 28, 2009.

A. Mayer, A. Wool, and E. Ziskind, Offline Firewall Analysis, International Journal of Information Security, Springer-Verlag, 2005.

A. Wool, Architecting the Lumeta Firewall Analyzer. Proc. USENIX Security Symposium, Washingron, D.C., 2001.

A. Wool, A quantitative study of firewall configuration errors, IEEE Computer, 37(6):62-67, 2004.

* cited by examiner

| Rules | Original | Source | destination | service | action |
|---|---|---|---|---|---|
| 1 | - | * | * | Domain TCP | pass |
| 2 | - | Trusted hosts | Gateways | * | pass |
| 3 | - | * | * | Domain UDP | pass |
| 4 | 1 | * | Board cast | Domain UDP | Drop |

Fig 2

| SOURCE | DESTINATION | SERVICE | RULES |
|---|---|---|---|
| outside | GW_scr_u01 (scru01.garden.com, ...) | domain_tcp | 1 |
| outside | GW_scr_u01 (scru01.garden.com, ...) | domain_tcp | 3 |
| TDE_0778_Viruscan | GW_scr_u01 (scru01.garden.com, ...) | remote | 30 |

Fig 3

| NAME | IP ADDRESS | DNS NAME |
|---|---|---|
| bbm0101_bbm_tdpub_com | 10.23.40.15192 | - |
| bbm070_INT | 192.168.18.1-192.168.18.63 | - |
| bbm_u01 | 10.23.40.16<br>192.168.16.254<br>192.168.17.254<br>192.168.18.254<br>192.168.19.254<br>192.168.20.254 | - |

Fig 4

| NAME | PROTOCOL | DESTINATIO | SOURCE PORT | CONTAINS | CONTAINED IN |
|---|---|---|---|---|---|
| daytime | TCP UDP | 13<br>13 | *<br>* | Day tine tcp<br>Dat time UDP | |
| Day tine tcp | TCP | 13 | * | - | daytime |
| Dat time UDP | UDP | 13 | * | - | daytime |

Fig 5

METHOD AND APPARATUS FOR AUTOMATIC RISK ASSESSMENT OF A FIREWALL CONFIGURATION

CROSS REFERENCE TO RELATED APPLICATIONS

The application is a continuation in part of application Ser. No. 11/175,781 filed on 7 Jul. 2005 claiming the priority of provisional U.S. patent application Ser. No. 60/587,938, filed Jul. 15, 2004.

FIELD OF THE INVENTION

The present invention relates generally to firewalls, and more particularly, to a method and apparatus for Automatic Risk Assessment of a Firewall Configuration.

BACKGROUND OF THE INVENTION

Network firewalls provide important safeguards for any network connected to the Internet. Firewalls are not simple applications that can be activated "out of the box." A firewall must be configured and managed to realize an important security policy for the particular needs of a given company or entity. It has been said that the most important factor affecting the security of a firewall is the firewall configuration A firewall is a network gateway that filters packets and separates a proprietary corporate network, such as an Intranet, from a public network, such as the Internet. Most of today's firewalls are configured by means of a rule-base or firewall configuration file. The rule-base instructs the firewall which inbound sessions (packets) to permit to pass, and which should be blocked. Similarly, the rule-base specifies which outbound sessions (packets) are permitted. The firewall administrator needs to implement the high-level corporate security policy using this low-level rule-base.

The firewall's configuration interface typically allows the security administrator to define various host-groups (ranges of IP addresses) and service-groups (groups of protocols and corresponding port-numbers at the hosts that form the end-points). A single rule typically includes a source, a destination, a service-group and an appropriate action. The source and destination are host-groups, and the action is generally either an indication to "pass" or "drop" the packets of the corresponding session In many firewalls, the rule-base is order sensitive. In other words, the firewall checks if the first rule in the rule-base applies to a new session. If the first rule applies, the packets are either passed or dropped according to the action specified by the first rule. Otherwise, the firewall checks if the second rule applies, and so forth until a rule applies. This scheme makes it difficult to understand what policy a firewall configuration is actually implementing, since the user needs to comprehend the effects of the whole rule-base, including any inter-play between subsequent rules.

Analyzing a firewall configuration is much worse for a larger company, whose rule-base may include thousands of rules, and whose firewall administration team includes many staff members, possibly in different locations.

As apparent from the above-described deficiencies with conventional techniques for administering a firewall, a need exists for analyzing and auditing firewall configurations.

The prior work of [Mayer et al; 2000, Mayer et al; 2005] and [Wool; 2001] teaches how to analyze Firewall Configurations and produce HTML-based Firewall Analyzer Reports. However, the said Reports produced by the methods of [Mayer et al; 2000, Mayer et al; 2005] are voluminous, and do not identify or rate the risks present within the Firewall Configuration. In the current state of the art, a Firewall administrator or auditor needs to navigate through the Firewall Analyzer Report, and use his or her expertise to identify any Configuration mistakes or badly written rules. The current invention shows how to automatically augment the Report with a Risk Assessment.

BRIEF SUMMARY OF THE INVENTION

The present invention provides a computer implemented method of detecting firewall mis-configurations of a firewall operatively associated with a computer network. The method comprises the following steps receiving a firewall configuration report exhibiting relationships between any potential packet received by the firewall and a corresponding action taken by the firewall in response, wherein the report is achieved by algorithmically simulating all potential packet receipts on an internal model of the firewall;

converting the firewall configuration report into a computer searchable file enabling detection of firewall mis-configurations; detecting firewall mis-configurations by searching the computer searchable file for mis-configurations in view of a predefined knowledge base exhibiting risk items associated with corresponding firewall mis-configurations;

customizing the detected firewall mis-configurations according to the knowledge base and the firewall configuration report thereby producing a list of risks associated with the firewall; and eliminating redundancy of reported risks by defining a suppression code for each risk associated with at least one second risk where the rules of the second risk contains the rules of the first risk, wherein the reported risks which have same number of triggering rules as the corresponding second risk defined by suppression code of the first risk, are suppressed The computer searchable file according to the present invention obeys a particular predefined schema indicating relationships between objects exhibited on tables in the report; and the searched mis-configurations are in a particular predefined search expression format that corresponds with the particular predefined schema;

According to some embodiments of the present invention the firewall configuration report is arranged according to name/type of risk accumulating all rules which triggered said risk, wherein said arrangement is a result of a what-if simulation for correlating the risks and their corresponding rules The Knowledge Base according to the present invention may be maintained in an Extensible Markup Language (XML) document.

The Knowledge Base according to the present invention may be maintained in a relational database.

Each risk item in said Knowledge Base may comprise at least one of:
    a brief description of the risk item;
    a risk rating;
    an explanation about the risk item;
    links to further details of the risk item; and
    a remedy.

According to some embodiments of the present invention the List-of-Risks is displayed in HTML format and may be displayed as a bar chart.

According to some embodiments of the present invention the risk items are customized before being searched for in said searchable report and the List-of-Risks is sorted in decreasing risk rating order.

The method according to the present invention may enable each risk item to be associated with a search expression used by the software module to search the computer searchable file to identify occurrences of said each risk item.

BRIEF DESCRIPTION OF THE DRAWINGS

FIG. 2 illustrates an excerpt from a rule base according to some embodiment of the prior art;

FIG. 3 illustrates a query, and the resulting query result table according to some embodiment of the present invention;

FIG. 4 illustrates an excerpt from a host group table according to some embodiment of the present invention;

FIG. 5 illustrates an excerpt from a service group table according to some embodiment of the present invention;

DETAILED DESCRIPTION OF THE INVENTION

The Firewall analysis that is described in references [Mayer et al; 2000, Wool; 2001, Mayer et al; 2005], produces a very detailed report about the action a Firewall would take on any type of packet it could ever see. We shall refer to an implementation of the methods of [Mayer et al; 2000, Wool; 2001, Mayer et al; 2005] as the Basic Software. The input for the Basic Software consists of the Firewall Configuration files and the Routing Table file. The Basic Software parses these files, produces an internal model, simulates the behavior of the Firewall (algorithmically, without sending any packets), and produces a Basic Report 200 as output.

The said Basic Report 200 consists of multiple tables, of several types. These tables are available in several formats: they are produced as blank-separated plain ASCII files, and then translated by the Basic Software into html (hyper-text markup language). The types of tables available in a Basic Report 200 include:

Rule tables: the main columns of a rule table are the source IP address, destination IP address, service (combination of protocol, and source & destination port numbers), and action (e.g., PASS/DROP). Other columns are often shown as well. See FIG. 2 for an example.

Query result tables: a query is of the form "which packets, among those with source IP addresses included in a set Src, destination IP addresses included in a set Dst, and service included in a set Srv, will reach their destination through the Firewall?" The result of a query is a table with columns including (at least): source IP address, destination IP address, service, and rules letting this type of service through. See FIG. 3 for an example.

Host group tables: These describe the IP addresses associated with a named definition, See FIG. 4 for an example.

Service group tables: These describe the protocols and port numbers associated with a named definition, See FIG. 5 for an example.

Finding Configuration Mistakes State of the Art

Many Firewalls are configured incorrectly, and the protection that they offer to the networks behind them is insufficient, as shown by [Wool; 2004]. The Basic Report 200 described above shows the effects of any mis-configuration, for instance, by showing that certain types of traffic are allowed to cross the Firewall. In the current state of the art, a Firewall administrator or auditor would navigate through the Basic Report, and use his or her expertise to identify any Configuration mistakes or badly written rules.

Figure 1:
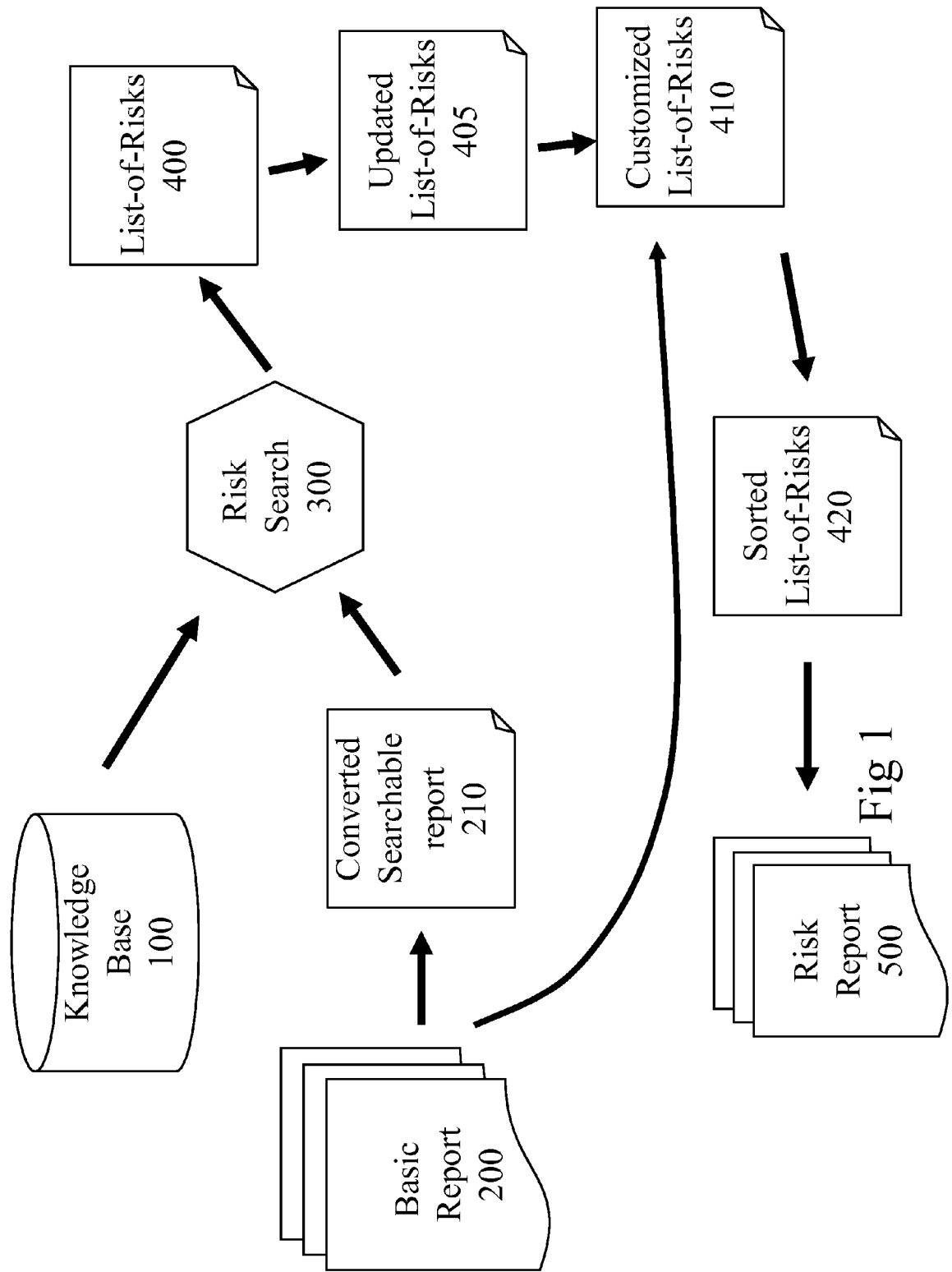
FIG. 1 is a schematic block diagram of the ADVISOR module according to some embodiment of the present invention.

According to the present invention it is suggested to provide wizard software module ("ADVISOR" module) to traverse the report and enhancing the search report, before the human user does, and flag the Configuration errors (see FIG. 1: Data flow through the ADVISOR). Each found mis-configuration is called a risk item. The software module may be implemented using an Intel x86-based PC running the RedHat Linux operating system.

For each risk item, the ADVISOR module produces the following items:
1. A brief description of the risk item (usually a short English sentence),
2. A risk rating (such as High/Medium/Low/Informational/Suspected),
3. An explanation about the risk item, and the reason why it is considered to be a risk,
4. Further details of the problem, and its causes, in the form of direct links to other parts of the Basic Report 200,
5. A suggestion about possible methods to prevent/remedy the problem.

The advisor module may include different functionalities for enhancing the report: The ADVISOR module can sorts the risk items in decreasing order of risk (higher risks appear first). The ADVISOR may produces various statistics and graphic charts about the general state of the analyzed Firewall (such as the number of risk items per risk category, a general rating of the Firewall's Configuration quality, comparison to historic data for the same Firewall or for other Firewalls, comparison to industry averages etc).

FIG. 1 illustrates the processing of the firewall configuration report by the advisory module. The ADVISOR module receives the basic reports from a Knowledge Base 100 which includes data encapsulating the knowledge of a Firewall auditor. The ADVISOR module flow comprises of the following steps:

Converting the Basic Report 200 into a Converted Searchable Report 210, in a format and schema that is suitable for searching for Configuration errors, searching the Converted Searchable Report 210 for each of the possible risk items listed in the Knowledge Base 100, and creating a List-of-Risks 400. For each risk item, generating all the elements of the risk item (in generic form).

defining suppression code for at least part of the risk items. Risk items which include definition of a suppression are associated with a second risk item which logically contains the first risk item.

examining pairs of risks which were associated by the suppression codes, by comparing the number of rules which triggered each of the two risks.

creating updated report 405 by eliminating from the report. suppressed risks having the same triggering rules of the associated paired risk.

Customizing the found risk items to match the current report to produce a Customized List-of-Risks 410, Sorting the Customized List-of-Risks 410 in decreasing risk rating order to produce a Sorted List-of-Risks 420 and displaying the Sorted List-of-Risks 420, and additional statistics and graphics, in the Risk Report 500.

Each of the above steps is described in more detail below.

The Knowledge Base 100

The ADVISOR's Knowledge Base 100 stores data which encapsulate the knowledge a Firewall auditor expert, the data structure of the expert knowledge is configured to adapt the structure and organization of the search report combined with an understanding of the structure and organization of the Basic Report. According to some embodiment of the present invention, the Knowledge Base 100 is organized in an XML (eXtensible Markup Language) document, however other formats (ranging from a flat text file to a relational database) are also possible.

The Knowledge Base 100 consists of multiple items, each detailing a possible risk item. Each possible risk item in the Knowledge Base 100 contains a search expression, where the search expression refers to, and makes use of, the schema of the Converted Searchable Report 210. The language used to write the expression is suitable for the Risk Search 300 mechanism described above. According to some embodiment expression is formatted in XQL (assuming that the Basic Report 200 is converted into XML format with a predefined schema). Alternative languages could be database query languages such as SQL.

The search expression may be customizable—i.e., it may contain keywords that will be instantiated as part of the search procedure. For instance, a % FWNAME keyword indicates the name of the Firewall.

The text in the various elements is written in customizable form: the text contains embedded keywords (such as % FWNAME to indicate the Firewall's name, or % RULE to indicate the number of a found rule).

Converting the Firewall Analyzer Report to a Searchable Format

In order to search for the possible risk items, the Basic Report 200 (or portions of it) needs to be converted into the Converted Searchable Report 210, in a searchable format. Such a format needs to be organized according to a defined schema. The schema indicates which columns appear in each table, how the tables relate to each other etc. According to some embodiments of the present invention the Converted Searchable Report 210 is a set of one or more XML documents. Alternative embodiments include database formats (such as MySQL or Oracle). The choice of search expressions in the risk items within the Knowledge Base 100, should be appropriate for the Converted Searchable Report 210 format.

According to further embodiments of the present invention it is suggested to enable the user to run a specific simulation for a defined risk. In this case the risk item may be defined to check specific servers, or specific range of addresses. Such a risk item may be not included in the basic firewall configuration report. The results of the simulation are integrated into the searchable configuration report enabling the ADVISOR system to search the report according to specific risk expression.

Searching the Report

After the Basic Report (or portions of it) is converted to a Converted Searchable Report 210, the ADVISOR Risk Search 300 performs the following procedure:

First scan all possible risk items in the Knowledge Base 100, for each possible risk item, Customize the search expression by replacing all the keywords with Firewall-specific information. Once the report is customized, search the converted report using the said customized search expression for said possible risk item. If the search is successful, add the possible risk item to the List-of-Risks 400. The elements of the risk item are still generic at this point. Attached to the risk item, the List-of-Risks 400 contains the details of the risk item (such as the rule number, or service name). The procedure defined above is repeated until all possible risk items have been tried.

Suppressing Risk Items

Figure 6:
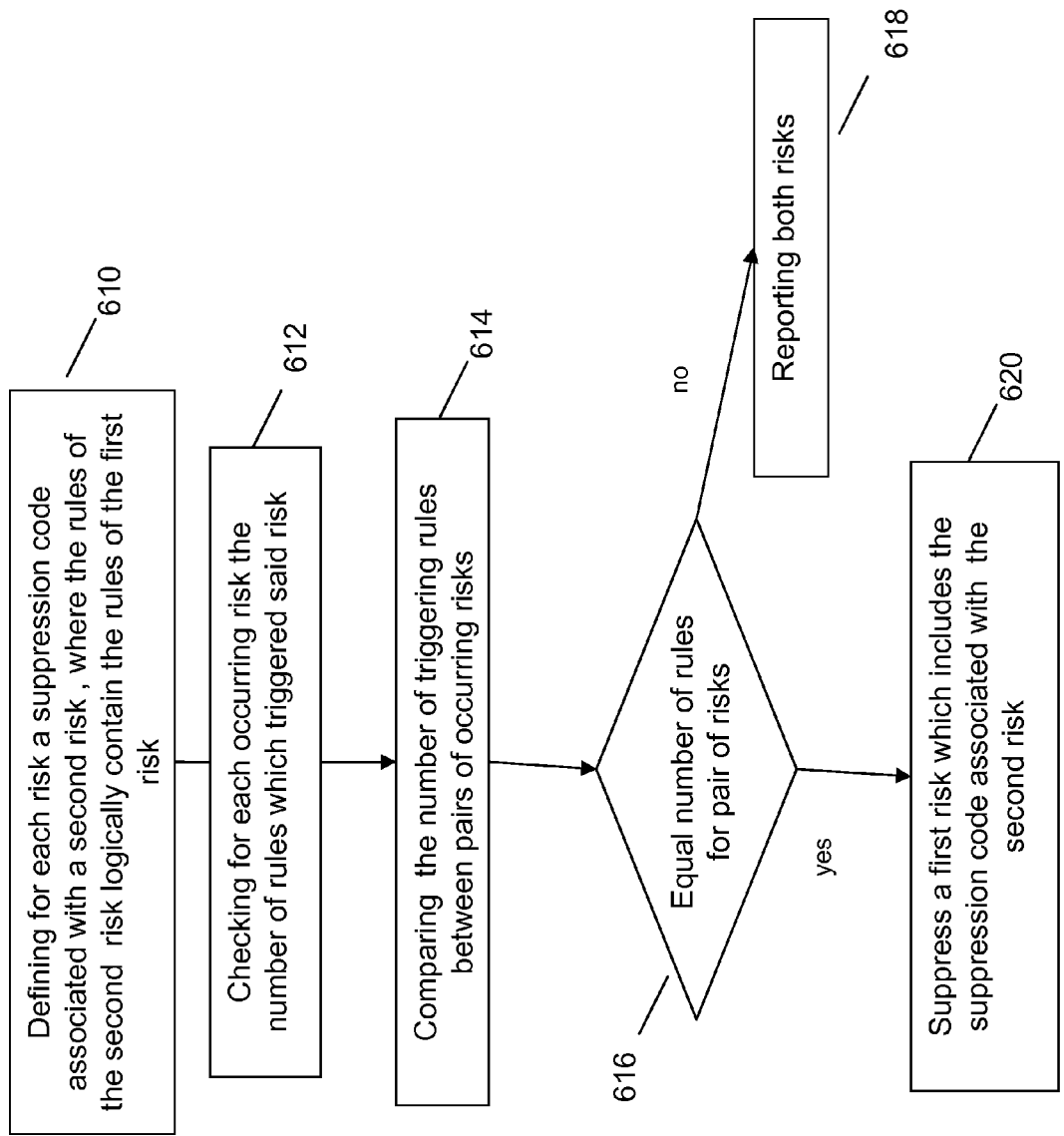
FIG. 6 a flow chart of enhancing the firewall configuration report according to some embodiment of the present invention.

FIG. 6 describes a further embodiment of enhancing the firewall configuration report according to the present invention. The List-of-Risks 400 may include duplication of risks occurrences, since some risk items are special cases of others. As a result, the same rule may trigger multiple risks. For instance, the risk item of "i05—allowing Telnet (TCP on port 23)" is a special case of the risk item "i03—allowing all TCP ports", which in turn is a special case of the risk "i01—allowing Any service". Thus, a rule that allows "Any service" will trigger all three risk items, and all three will appear in the Updated List-of-Risks 405. It is suggested to optionally associate a "suppressed-by" attribute risk item, wherein the code of a more general risk item is specified. In the abovementioned example, the i05 risk item will be "suppressed-by" the i03 risk item, which in turn is "suppressed-by" the i01 risk item.

To enable such identification for at least some of the risk items, a suppression code is defined for at least part of the risk items. Risk items which include definition of a suppression are associated with a second risk item which logically contains the first risk item (610). When editing/creating the firewall configuration report, pairs of risks which were associated by the suppression codes are examined by comparing the number of rules which triggered each of the two risks (616). In case the number of triggering rules is the same for both risks, the first risk is suppressed, eliminating it from the report (620). Otherwise both risks will appear in the report (618).

Customizing the Risk Items

After the Updated List-of-Risks 405 is created, the ADVISOR performs the following procedure: First scan all risk items in the Updated List-of-Risk items.

For each risk item:
Replace the generic keywords with the specific information that is pertinent to the current Basic Report 200 and the current risk item. For instance, the % RULE keyword is replace by the number of the rule that matched the current risk item, and the % FWNAME keyword is replaced by the name of the current Firewall. Some of the generic keywords indicate hyperlinks to parts of the Basic Report 200 where further details may be found (such as definitions of the found service). These hyperlink keywords are replaced by the appropriate hyperlink information (such as URLs).

Add the customized risk to the Customized List-of-Risks 410.

Sorting and Presenting the Risk Items

After the Customized List-of-Risks 410 is created, the ADVISOR sorts the risk items in decreasing order of risk (Highest risks appear first) to create the Sorted List-of-Risks 420.

The ADVISOR calculates the various statistics (such as the number of risk items per risk category), and produces this information in tabular, textual, or graphic format. The combination of the Sorted List-of-Risks 420, and the additional statistics and graphics form the Risk Report 500.

The ADVISOR outputs the formatted Risk Report 500 as additional pages that are incorporated into the Basic Report 200. A preferred embodiment is to place the brief description, along with the above-mentioned statistics, into an executive summary, and to place the risk items themselves in a separate risk assessment page.

What is claimed is:

1. A computer implemented method of detecting firewall mis-configurations of a firewall operatively associated with a computer network, the method is comprising the following steps:
   receiving a firewall configuration;
   algorithmically simulating all potential packet received on an internal model of the firewall;
   generating a simulation report that is exhibiting relationships between any potential packet received by the firewall and a corresponding action taken by the firewall in response;
   converting the simulation report into a computer searchable file thus enabling detection of firewall mis-configurations;
   detecting firewall mis-configurations by searching the computer searchable file for mis-configurations in view of a predefined knowledge base exhibiting risk items associated with corresponding firewall mis-configurations;
   producing a list of risks associated with the firewall based on a customization of the detected firewall mis-configurations, wherein the customization is according to the knowledge base and the simulation report; and
   eliminating redundancy of reported risks by defining a suppression code for each risk associated with at least one second risk where the rules of the second risk logically contains the rules of the first risk,
      wherein the reported risks which have same number of triggering rules as the corresponding second risk defined by suppression code of the first risk, are suppressed,
      wherein the computer searchable file obeys a particular predefined schema indicating relationships between objects exhibited on tables in the simulation report, and
      wherein the searched mis-configurations are in a particular predefined search expression format that corresponds with the particular predefined schema.

2. The method of claim 1, wherein the simulation report is further arranged according to name/type of risk accumulating all rules which triggered said risk, wherein said arrangement is a result of what-if simulation for correlating the risks and their corresponding rules.

3. A computer implemented method of detecting firewall mis-configurations of a firewall operatively associated with a computer network, the method comprising:
   receiving a firewall configuration;
   algorithmically simulating all potential packet received on an internal model of the firewall;
   generating a simulation report that is exhibiting relationships between any potential packet received by the firewall and a corresponding action taken by the firewall in response;
   converting the simulation report into a computer searchable file enabling detection of firewall mis-configurations;
   detecting firewall mis-configurations by searching the computer searchable file for mis-configurations in view of a predefined knowledge base stored on the memory exhibiting risk items associated with corresponding firewall mis-configurations; and
   customizing the detected firewall mis-configurations according to the knowledge base and the simulation report thereby producing a list of risks associated with the firewall;
   conducting a simulation of firewall activation for specific risk type defined by a user; and
   integrating simulation results within the computer searchable file,
   wherein the computer searchable file obeys a particular predefined schema indicating relationships between objects exhibited on tables in the report, and
   wherein the searched mis-configurations are in a particular predefined search expression format that correspond with the particular predefined schema, and
   wherein the integrated computer searchable file enables searching according risk type.

4. The method according to claim 1, wherein the Knowledge Base is maintained in an Extensible Markup Language (XML) document.

5. The method according to claim 1, wherein the Knowledge Base is maintained in a relational database.

6. The method according to claim 1, wherein each risk item in said Knowledge Base comprises at least one of:
   a brief description of the risk item;
   a risk rating;
   an explanation about the risk item;
   links to further details of the risk item; and
   a remedy.

7. The method according to claim 1, wherein the List-of-Risks is displayed in HTML format.

8. The method according to claim 1, wherein the List-of-Risks is displayed as a bar chart.

9. The method of claim 1, wherein the risk items are customized before being searched for in said searchable report.

10. The method of claim 1, wherein said List-of-Risks is sorted in decreasing risk rating order.

11. The method of claim 1, wherein each risk item associated with a search expression used by the software module to search the computer searchable file to identify occurrences of said each risk item.

12. A data processing system for detecting firewall mis-configurations of a firewall, operatively associated with a computer network, the system comprising:
   a processor; and
   a memory,
      wherein the processor is configured by a computer readable code such that the processor is operable to:
      receive a firewall configuration;
      algorithmically simulate all potential packet received on an internal model of the firewall;
      generate a simulation report that is exhibiting relationships between any potential packet received by the firewall and a corresponding action taken by the firewall in response;
   convert the simulation report into a computer searchable file enabling detection of firewall mis-configurations;
   detect firewall mis-configurations by searching the computer searchable file for mis-configurations in view of a predefined knowledge base stored on the memory exhibiting risk items associated with corresponding firewall mis-configurations;
   produce a list of risks associated with the firewall based on a customization of the detected firewall mis-configurations, wherein the customization is according to the knowledge base and the simulation report thereby producing a list of risks associated with the firewall; and
   eliminate redundancy of reported risks by defining a suppression code for each risk associated with at least one second risk where the rules of the second risk contains the rules of the first risk, wherein the reported risks which have same number of triggering rules as the corresponding second risk defined by suppression code of the first risk, are suppressed, wherein the computer searchable file obeys a particular predefined schema indicating relationships between objects exhibited on tables in the report, and wherein the searched mis-configurations are in a particular predefined search expression format that corresponds with the particular predefined schema.

13. A computer implemented method of detecting firewall mis-configurations of a firewall operatively associated with a computer network, the method comprising:

receiving a firewall configuration;

algorithmically simulating all potential packet receipts on an internal model of the firewall;

generating a simulation report that is exhibiting relationships between any potential packet received by the firewall and a corresponding action taken by the firewall in response;

converting the simulation report into a computer searchable file thus enabling detection of firewall mis-configurations;

detecting firewall mis-configurations by searching the computer searchable file for mis-configurations in view of a predefined knowledge base exhibiting risk items associated with corresponding firewall mis-configurations; and producing a list of risks associated with the firewall according to customization of the detected firewall mis-configurations, wherein the customization is according to the knowledge base and the simulation report, wherein the computer searchable file obeys a particular predefined schema indicating relationships between objects exhibited on tables in the report, and wherein the searched mis-configurations are in a particular predefined search expression format that corresponds with the particular predefined schema.

* * * * *